United States Patent Office 3,816,502

Patented June 11, 1974

3,816,502

INSECTICIDAL ACTIVE GERANYL AND CITRONYL AMINE DERIVATIVES AND THEIR EPOXIDES

Ferenc M. Pallos, Walnut Creek, and Julius J. Menn, Saratoga, Calif., assignors to Stauffer Chemical Company, New York, N.Y.

No Drawing. Original application Aug. 16, 1971, Ser. No. 172,202, now abandoned. Divided and this application Apr. 30, 1973, Ser. No. 355,601
Int. Cl. C07c *154/00*
U.S. Cl. 260—455 A 39 Claims

ABSTRACT OF THE DISCLOSURE

Compounds having the formula

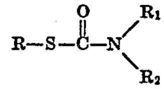

wherein R can be selected from the group consisting of alkyl, alkenyl, alkynyl, alicyclic, ketoalkyl, alkoxyalkyl, alkylthioalkyl, carbalkoxy, carboxamido, dialkylaminoalkyl, cyanoalkyl, haloalkyl, aryl, aralkyl, and substituted aryl and aralkyl, wherein said substituents can be selected from halogen, alkyl, alkoxy and alkylthio; $R_1$ can be selected from hydrogen, alkyl, alkoxyalkyl, alkylthioalkyl, cyanoalkyl, alkenyl and alkynyl; $R_2$ can be selected from the group consisting of

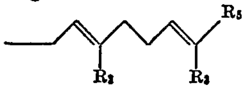,

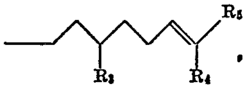,

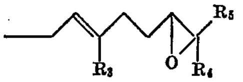

and

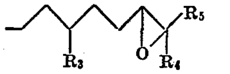

wherein $R_3$, $R_4$ and $R_5$ are independently selected from methyl and ethyl. These compounds are active in blocking normal development and/or reproduction of insect species which can be applied at certain stages of insect development.

This is a division of Ser. No. 172,202, filed Aug. 16, 1971, now abandoned.

DESCRIPTION OF THE INVENTION

This invention is directed to a novel group of compounds which may be generally described as certain thiolcarbamates and their epoxide derivatives which are active insecticides. The compounds of the present invention are represented by the generic formula

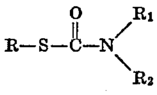

wherein R can be selected from the group consisting of alkyl, alkenyl, alkynyl, alicyclic, ketoalkyl, alkoxyalkyl, alkylthioalkyl, carbalkoxy, carboxamido, dialkylaminoalkyl, cyanoalkyl, haloalkyl, aryl, aralkyl, and substituted aryl and aralkyl, wherein said substituents can be selected from halogen, alkyl, alkoxy and alkylthio; $R_1$ can be selected from hydrogen, alkyl, alkoxyalkyl, alkylthioalkyl, cyanoakyl, alkenyl and alkynyl; $R_2$ can be selected from the group consisting of

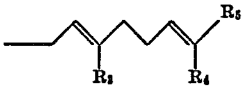;

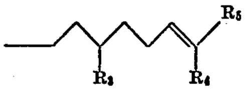;

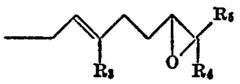

and

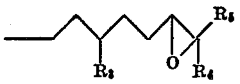

wherein $R_3$, $R_4$ and $R_5$ are independenty selected from methyl and ethyl.

In general, the above compounds can be prepared by reacting a halothiolformate with an appropriate amine in the presence of a solvent such as methylene chloride. In order to achieve high yields, an acid acceptor such as triethylamine or pyridine is preferably employed, although other acid acceptors can be used. The epoxide derivative can be made using a well-known epoxidizing agent.

It has been found that this class of compounds acts in a different manner on insects than conventional insecticides, and exerts a disrupting influence upon the normal development of the insects. These compounds impede the metamorphosis leading to normal pupation of pest insects and result in the formation of members of the treated species which are abnormal, non-viable or sterile. This ultimately leads, indirectly at least, to the destruction of a pest population.

Preparation of the compounds of this invention are illustrated by the following examples:

EXAMPLE 1

N-geranyl, S-phenylthiolcarbamate

A mixture was formed containing 1.7 g. (0.01 moles) of phenylchlorothiolformate in 20 ml. of methylene chloride and cooled in an ice bath. Then, 0.8 g. of pyridine was added. Then, 1.5 g. (0.01 moles) of geranylamine in 5 ml. of methylene chloride was slowly added dropwise while the mixture was maintained in an ice bath for cooling. The mixture was stirred at room temperature overnight. Then, additional methylene chloride was added, the mixture was washed twice with water, dried over magnesium sulfate, filtered and stripped to provide 2.2 g. of product, $n_D^{30}$—1.5682.

EXAMPLE 2

N-geranyl, S-ethylthiolcarbamate

A mixture was formed containing 1.25 g. (0.01 moles) of ethylchlorothiolformate in 20 ml. of methylene chloride and cooled in an ice bath. Then, 0.8 g. (0.01 moles) of pyridine was added. While the mixture was in the ice bath, 1.5 g. (0.01 moles) of geranylamine in 5 ml. of methylene chloride was added dropwise. The mixture was stirred at room temperature overnight. Then, additional methylene chloride was added, the mixture washed with water twice, dried over magnesium sulfate, filtered and stripped to provide a yield of 1.7 g., $n_D^{30}$—1.5100.

Other compounds can be prepared in an analogous manner starting with the appropriate materials as outlined above. The following is a table of compounds representative of those embodied by the present invention. Compound numbers have been assigned to them and are used for identification throughout the balance of the specification.

TABLE I

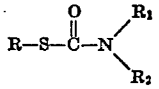

| Compound number | R | $R_1$ | $R_2$ | $R_3$ | $R_4$ | $R_5$ |
|---|---|---|---|---|---|---|
| 1 |  | H | 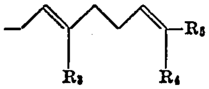 | $CH_3$ | $CH_3$ | $CH_3$ |
| 2 | $C_2H_5$ | H | Same as above | $CH_3$ | $CH_3$ | $CH_3$ |
| 3 | $CH_3$ | H | do | $CH_3$ | $CH_3$ | $CH_3$ |
| 4 | $n\text{-}C_3H_7$ | H | do | $CH_3$ | $CH_3$ | $CH_3$ |
| 5 | $i\text{-}C_3H_7$ | H | do | $CH_3$ | $CH_3$ | $CH_3$ |
| 6 | $n\text{-}C_4H_9$ | H | do | $CH_3$ | $CH_3$ | $CH_3$ |
| 7 | $i\text{-}C_4H_9$ | H | do | $CH_3$ | $CH_3$ | $CH_3$ |
| 8 | $sec\text{-}C_4H_9$ | H | do | $CH_3$ | $CH_3$ | $CH_3$ |
| 9 | $t\text{-}C_4H_9$ | H | do | $CH_3$ | $CH_3$ | $CH_3$ |
| 10 | $i\text{-}C_5H_{11}$ | H | do | $CH_3$ | $CH_3$ | $CH_3$ |
| 11 | $n\text{-}C_6H_{13}$ | H | do | $CH_3$ | $CH_3$ | $CH_3$ |
| 12 | $CH_2{=}CH{-}CH_2$ | H | do | $CH_3$ | $CH_3$ | $CH_3$ |
| 13 | $CH_3{-}CH{=}CH{-}CH_2$ | H | do | $CH_3$ | $CH_3$ | $CH_3$ |
| 14 | $CH_2{=}C(CH_3){-}CH_2$ | H | do | $CH_3$ | $CH_3$ | $CH_3$ |
| 15 | $CH_3{-}C(=O){-}CH_2$ | H | do | $CH_3$ | $CH_3$ | $CH_3$ |
| 16 | $CH_3{-}S{-}CH_2{-}CH_2$ | H | do | $CH_3$ | $CH_3$ | $CH_3$ |
| 17 | $C_2H_5{-}O{-}CH_2{-}CH_2$ | H | do | $CH_3$ | $CH_3$ | $CH_3$ |
| 18 | $C_2H_5{-}C{-}C(=O){-}CH_2$ | H | do | $CH_3$ | $CH_3$ | $CH_3$ |
| 19 | $(C_2H_5)_2{-}N{-}C(=O){-}CH_2$ | H | do | $CH_3$ | $CH_3$ | $CH_3$ |
| 20 | 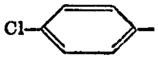 | H | do | $CH_3$ | $CH_3$ | $CH_3$ |
| 21 | 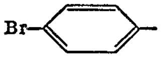 | H | do | $CH_3$ | $CH_3$ | $CH_3$ |
| 22 | 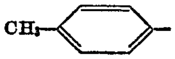 | H | do | $CH_3$ | $CH_3$ | $CH_3$ |
| 23 | 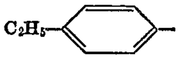 | H | do | $CH_3$ | $CH_3$ | $CH_3$ |
| 24 | 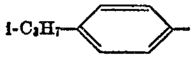 | H | do | $CH_3$ | $CH_3$ | $CH_3$ |
| 25 | 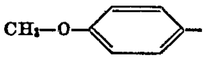 | H | do | $CH_3$ | $CH_3$ | $CH_3$ |
| 26 | 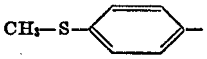 | H | do | $CH_3$ | $CH_3$ | $CH_3$ |
| 27 | 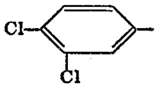 | H | do | $CH_3$ | $CH_3$ | $CH_3$ |
| 28 |  | H | do | $CH_3$ | $CH_3$ | $CH_3$ |
| 29 | $CH_3$ | H | 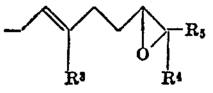 | $CH_3$ | $CH_3$ | $CH_3$ |
| 30 |  | H | Same as above | $CH_3$ | $CH_3$ | $CH_3$ |
| 31 | $C_2H_5$ | H | do | $CH_3$ | $CH_3$ | $CH_3$ |
| 32 | $n\text{-}C_3H_7$ | H | do | $CH_3$ | $CH_3$ | $CH_3$ |
| 33 | $i\text{-}C_3H_7$ | H | do | $CH_3$ | $CH_3$ | $CH_3$ |
| 34 | $n\text{-}C_4H_9$ | H | do | $CH_3$ | $CH_3$ | $CH_3$ |
| 35 | $i\text{-}C_4H_9$ | H | do | $CH_3$ | $CH_3$ | $CH_3$ |
| 36 | $sec\text{-}C_4H_9$ | H | do | $CH_3$ | $CH_3$ | $CH_3$ |
| 37 | $t\text{-}C_4H_9$ | H | do | $CH_3$ | $CH_3$ | $CH_3$ |
| 38 | $i\text{-}C_5H_{11}$ | H | do | $CH_3$ | $CH_3$ | $CH_3$ |
| 39 | $n\text{-}C_6H_{13}$ | H | do | $CH_3$ | $CH_3$ | $CH_3$ |
| 40 | $CH_2{=}CH{-}CH_2$ | H | do | $CH_3$ | $CH_3$ | $CH_3$ |
| 41 | $CH_3{-}CH{=}CH{-}CH_2$ | H | do | $CH_3$ | $CH_3$ | $CH_3$ |
| 42 | $CH_2{=}C(CH_3){-}CH_2$ | H | do | $CH_3$ | $CH_3$ | $CH_3$ |

TABLE I—Continued

| Compound number | R | $R_1$ | $R_2$ | $R_3$ | $R_4$ | $R_5$ |
|---|---|---|---|---|---|---|
| 43 | $CH_3-\overset{O}{\overset{\|}{C}}-CH_2$ | H | Same as in Compound 29 | $CH_3$ | $CH_3$ | $CH_3$ |
| 44 | $CH_3-S-CH_2-CH_2$ | H | do | $CH_3$ | $CH_3$ | $CH_3$ |
| 45 | $C_2H_5-O-CH_2-CH_2$ | H | do | $CH_3$ | $CH_3$ | $CH_3$ |
| 46 | $C_2H_5-O-\overset{O}{\overset{\|}{C}}-CH_2$ | H | do | $CH_3$ | $CH_3$ | $CH_3$ |
| 47 | $(C_2H_5)_2-N-\overset{O}{\overset{\|}{C}}-CH_2$ | H | do | $CH_3$ | $CH_3$ | $CH_3$ |
| 48 |  | H | do | $CH_3$ | $CH_3$ | $CH_3$ |
| 49 |  | H | do | $CH_3$ | $CH_3$ | $CH_3$ |
| 50 | 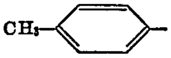 | H | do | $CH_3$ | $CH_3$ | $CH_3$ |
| 51 | 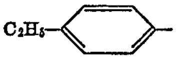 | H | do | $CH_3$ | $CH_3$ | $CH_3$ |
| 52 | 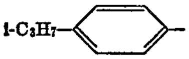 | H | do | $CH_3$ | $CH_3$ | $CH_3$ |
| 53 | 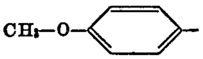 | H | do | $CH_3$ | $CH_3$ | $CH_3$ |
| 54 | 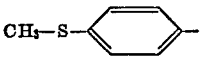 | H | do | $CH_3$ | $CH_3$ | $CH_3$ |
| 55 | 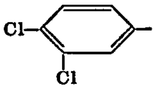 | H | do | $CH_3$ | $CH_3$ | $CH_3$ |
| 56 |  | H | do | $CH_3$ | $CH_3$ | $CH_3$ |
| 57 | $C_2H_5$ | $C_2H_5$ | 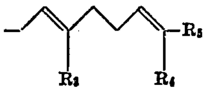 | $CH_3$ | $CH_3$ | $CH_3$ |
| 58 | $C_2H_5$ | $CH_3$ | Same as above | $CH_3$ | $CH_3$ | $CH_3$ |
| 59 | $C_2H_5$ | $C_2H_5$ | do | $C_2H_5$ | $C_2H_5$ | $CH_3$ |
| 60 | $C_2H_5$ | $C_2H_5$ | do | $CH_3$ | $CH_3$ | $CH_3$ |
| 61 | i-$C_3H_7$ | $CH_2CN$ | do | $CH_3$ | $CH_3$ | $CH_3$ |
| 62 | $CH_3$ | $CH_2CH=CH_2$ | do | $CH_3$ | $CH_3$ | $CH_3$ |
| 63 | $CH_3$ | $CH_2C\equiv CH$ | do | $CH_3$ | $CH_3$ | $CH_3$ |
| 64 | $CH_3$ | $CH_2OCH_3$ | do | $CH_3$ | $CH_3$ | $CH_3$ |
| 65 | $CH_3-C\equiv C-CH_2$ | $C_2H_5$ | do | $CH_3$ | $CH_3$ | $CH_3$ |
| 66 |  | H | do | $CH_3$ | $CH_3$ | $CH_3$ |
| 67 | $ClCH_2CH_2$ | $CH_3$ | do | $CH_3$ | $CH_3$ | $CH_3$ |
| 68 | $C_2H_5$ | $C_2H_5$ | 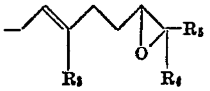 | $CH_3$ | $CH_3$ | $CH_3$ |
| 69 | $C_2H_5$ | $CH_3$ | Same as above | $CH_3$ | $CH_3$ | $CH_3$ |
| 70 | $C_2H_5$ | $C_2H_5$ | do | $C_2H_5$ | $C_2H_5$ | $CH_3$ |
| 71 | $C_2H_5$ | $C_2H_5$ | do | $CH_3$ | $CH_3$ | $CH_3$ |
| 72 | i-$C_3H_7$ | $CH_2CN$ | do | $CH_3$ | $CH_3$ | $CH_3$ |
| 73 | $CH_3$ | $CH_2CH=CH_2$ | do | $CH_3$ | $CH_3$ | $CH_3$ |
| 74 | $CH_3$ | $CH_2C\equiv CH$ | do | $CH_3$ | $CH_3$ | $CH_3$ |
| 75 | $CH_3$ | $CH_2OCH_3$ | do | $CH_3$ | $CH_3$ | $CH_3$ |
| 76 | $CH_3-C\equiv C-CH_2$ | $C_2H_5$ | do | $CH_3$ | $CH_3$ | $CH_3$ |
| 77 |  | H | do | $CH_3$ | $CH_3$ | $CH_3$ |
| 78 | $ClCH_2CH_2$ | $CH_3$ | do | $CH_3$ | $CH_3$ | $CH_3$ |
| 79 | i-$C_3H_7$ | $C_2H_5$ | do | $CH_3$ | $CH_3$ | $CH_3$ |
| 80 | $CH_3$ | $C_2H_5$ | do | $CH_3$ | $CH_3$ | $CH_3$ |
| 81 | n-$C_3H_7$ | $C_2H_5$ | do | $CH_3$ | $CH_3$ | $CH_3$ |
| 82 | $C_2H_5O\overset{O}{\overset{\|}{C}}CH_2$ | $C_2H_5$ | do | $CH_3$ | $CH_3$ | $CH_3$ |

INSECTICIDAL EVALUATION TEST

The degree of activity of a candidate compound to hinder or impede the metamorphosis of insects is measured by treating the early pupal stage of a representative insect with the compound and examining it after its last molt toward the adult form for retention of immature features.

Specifically, yellow mealworm, *Tenebrio molitor,* L., larvae are maintained at 28° C. and 40% humidity on a diet of bran flakes. Prepupae are collected from the culture and kept in separate containers. The pupae, collected once daily, are 1–25 hours old at the time of treatment. By means of a syringe, suitable amounts of candidate compounds in 0.5 or 1.0 $\mu$l. of acetone are applied to the venter of *Tenebrio molitor,* L. pupae. Treated pupae are maintained at 28° C. and 50% humidity until the adults emerged (usually within 6–8 days). Emerged adults are graded as positive, negative, or dead. To be considered a positive response, the presence of typical pupal cuticle, urogomphi, gin trap, and abnormal wings, etc. are required. For each test, 2 groups of 20 pupae were used and the averaged results were reported.

The dose of a candidate compound per pupa that is needed to kill or give a positive response in the above insecticidal evaluation test for 10 of the 20 pupae is determined. Table II shows these doses under the column $ED_{50}$.

TABLE II

| Compound No.: | $ED_{50}$, $\mu$g./pupa |
|---|---|
| 1 | 2 |
| 2 | 0.2 |
| 5 | <0.1 |
| 20 | >10 |
| 22 | >10 |
| 29 | >10 |
| 31 | 3 |
| 32 | 0.2 |
| 33 | 3 |
| 48 | >10 |
| 57 | >10 |
| 68 | 1 |
| 79 | 1 |
| 80 | >10 |
| 81 | 0.2 |
| 82 | >10 |

The compounds of this invention are generally embodied into a form suitable for convenient application. For example, the compounds can be embodied into pesticidal composition which are provided in the form of emulsions, suspensions, solutions, dusts and aerosol sprays. In general, such composition will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc. upon which the pest feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition; for example, an emulsion, suspension, or aerosol spray. While the concentration of the active pesticide in the present compositions can vary within rather wide limits, ordinarily the pesticide compound will comprise not more than about 50% by weight of the composition. Preferably, however, the pesticide compositions of this invention will be in the form of solutions or suspensions containing about 0.1 to 1.0% by weight of the active pesticide compound.

What is claimed is:

1. A compound having the formula:

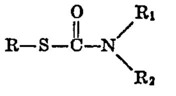

wherein R can be selected from group consisting alkyl having 1 to 6 carbon atoms, alkenyl having 3 to 4 carbon atoms, alkynyl having 3 to 4 carbon atoms, alkoxyalkyl having 1 to 4 carbon atoms, alkylthioalkyl having 1 to 4 carbon atoms, haloalkyl having 1 to 6 carbon atoms, cycloalkyl, carboalkoxyalkyl having 3 to 4 carbon atoms, dialkylcarbamylalkyl having 4 to 8 carbon atoms, phenyl, substituted phenyl wherein said substituents are selected from the halogen, alkyl, alkoxy and thioalkyl each having 1 to 4 carbon atoms, phenalkyl, and chlorophenalkyl; $R_1$ can be selected from group consisting of hydrogen, alkyl having 1 to 4 carbon atoms, alkoxyalkyl having 2 to 4 carbon atoms, cyanoalkyl having 2 to 4 carbon atoms and alkynyl having 3 to 4 carbon atoms; $R_2$ can be selected from group consisting of

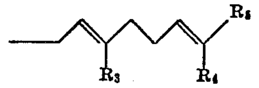

and

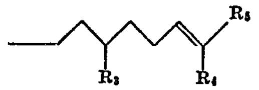

wherein $R_3$, $R_4$ and $R_5$ are independently selected from methyl and ethyl.

2. A compound as set forth in claim 1 wherein R is

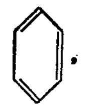

$R_1$ is H, $R_2$ is

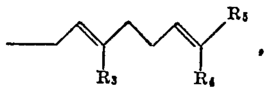

$R_3$ is $CH_3$, $R_4$ is $CH_3$ and $R_5$ is $CH_3$.

3. A compound as set forth in claim 1 wherein R is $C_2H_5$, $R_1$ is H, $R_2$ is

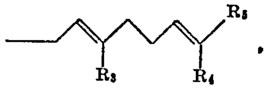

$R_3$ is $CH_3$, $R_4$ is $CH_3$ and $R_5$ is $CH_3$.

4. A compound as set forth in claim 1 wherein R is $CH_3$, $R_1$ is H, $R_2$ is

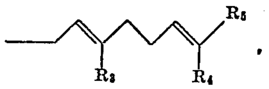

$R_3$ is $CH_3$, $R_4$ is $CH_3$ and $R_5$ is $CH_3$.

5. A compound as set forth in claim 1 wherein R is n-$C_3H_7$, $R_1$ is H, $R_2$ is

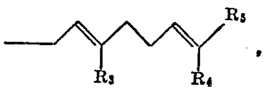

$R_3$ is $CH_3$, $R_4$ is $CH_3$ and $R_5$ is $CH_3$.

6. A compound as set forth in claim 1 wherein R is i-$C_3H_7$, $R_1$ is H, $R_2$ is

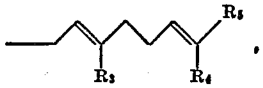

$R_3$ is $CH_3$, $R_4$ is $CH_3$ and $R_5$ is $CH_3$.

7. A compound as set forth in claim 1 wherein R is n-$C_4H_9$, $R_1$ is H, $R_2$ is

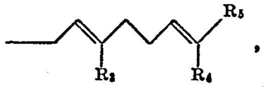

$R_3$ is $CH_3$, $R_4$ is $CH_3$ and $R_5$ is $CH_3$.

8. A compound as set forth in claim 1 wherein R is i-$C_4H_9$, $R_1$ is H, $R_2$ is

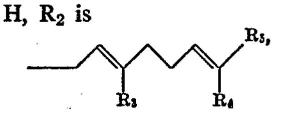

$R_3$ is $CH_3$, $R_4$ is $CH_3$ and $R_5$ is $CH_3$.

9. A compound as set forth in claim 1 wherein R is sec-$C_4H_9$, $R_1$ is H, $R_2$ is

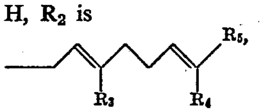

$R_3$ is $CH_3$, $R_4$ is $CH_3$ and $R_5$ is $CH_3$.

10. A compound as set forth in claim 1 wherein R is t-$C_4H_9$, $R_1$ is H, $R_2$ is

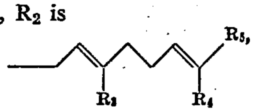

$R_3$ is $CH_3$, $R_4$ is $CH_3$ and $R_5$ is $CH_3$.

11. A compound as set forth in claim 1 wherein R is i-$C_5H_{11}$, $R_1$ is H, $R_2$ is

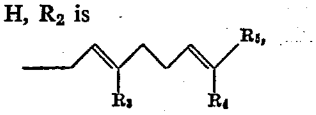

$R_3$ is $CH_3$, $R_4$ is $CH_3$ and $R_5$ is $CH_3$.

12. A compound as set forth in claim 1 wherein R is n-$C_6H_{13}$, $R_1$ is H, $R_2$ is

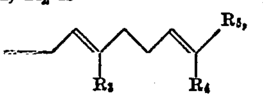

$R_3$ is $CH_3$, $R_4$ is $CH_3$ and $R_5$ is $CH_3$.

13. A compound as set forth in claim 1 wherein R is $CH_2=CH-CH_2$, $R_1$ is H, $R_2$ is

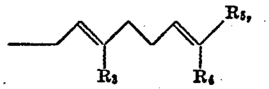

$R_3$ is $CH_3$, $R_4$ is $CH_3$ and $R_5$ is $CH_3$.

14. A compound as set forth in claim 1 wherein R is $CH_3-CH=CH-CH_2$, $R_1$ is H, $R_2$ is

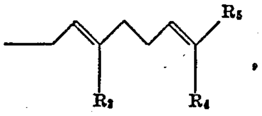

$R_3$ is $CH_3$, $R_4$ is $CH_3$ and $R_5$ is $CH_3$.

15. A compound as set forth in claim 1 wherein R is

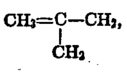

$R_1$ is H, $R_2$ is

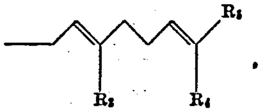

$R_3$ is $CH_3$, $R_4$ is $CH_3$ and $R_5$ is $CH_3$.

16. A compound as set forth in claim 1 wherein R is

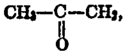

$R_1$ is H, $R_2$ is

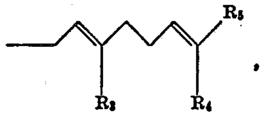

$R_3$ is $CH_3$, $R_4$ is $CH_3$ and $R_5$ is $CH_3$.

17. A compound as set forth in claim 1 wherein R is $CH_3-S-CH_2-CH_2$, $R_1$ is H, $R_2$ is

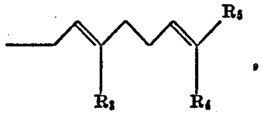

$R_3$ is $CH_3$, $R_4$ is $CH_3$ and $R_5$ is $CH_3$.

18. A compound as set forth in claim 1 wherein R is $C_2H_5-O-CH_2-CH_2$, $R_1$ is H, $R_2$ is

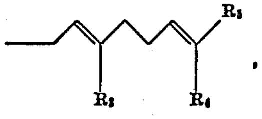

$R_3$ is $CH_3$, $R_4$ is $CH_3$ and $R_5$ is $CH_3$.

19. A compound as set forth in claim 1 wherein R is

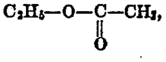

$R_1$ is H, $R_2$ is

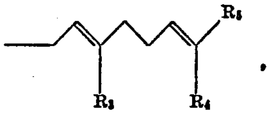

$R_3$ is $CH_3$, $R_4$ is $CH_3$ and $R_5$ is $CH_3$.

20. A compound as set forth in claim 1 wherein R is

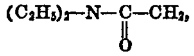

$R_1$ is H, $R_2$ is

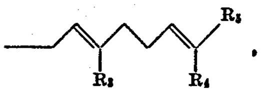

$R_3$ is $CH_3$, $R_4$ is $CH_3$ and $R_5$ is $CH_3$.

21. A compound as set forth in claim 1 wherein R is

$R_1$ is H, $R_2$ is

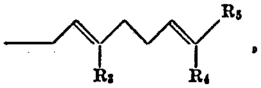

$R_3$ is $CH_3$, $R_4$ is $CH_3$ and $R_5$ is $CH_3$.

22. A compound as set forth in claim 1 wherein R is

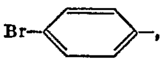

$R_1$ is H, $R_2$ is

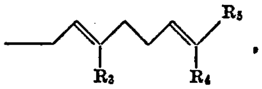

$R_3$ is $CH_3$, $R_4$ is $CH_3$ and $R_5$ is $CH_3$.

23. A compound as set forth in claim 1 wherein R is

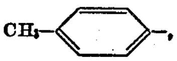

$R_1$ is H, $R_2$ is

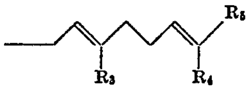

, $R_3$ is $CH_3$, $R_4$ is $CH_3$ and $R_5$ is $CH_3$.

24. A compound as set forth in claim 1 wherein R is

$R_1$ is H, $R_2$ is

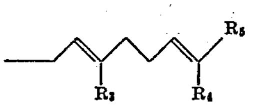

, $R_3$ is $CH_3$, $R_4$ is $CH_3$ and $R_5$ is $CH_3$.

25. A compound as set forth in claim 1 wherein R is

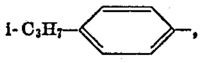

$R_1$ is H, $R_2$ is

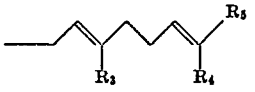

, $R_3$ is $CH_3$, $R_4$ is $CH_3$ and $R_5$ is $CH_3$.

26. A compound as set forth in claim 1 wherein R is

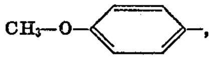

$R_1$ is H, $R_2$ is

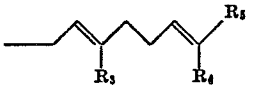

, $R_3$ is $CH_3$, $R_4$ is $CH_3$ and $R_5$ is $CH_3$.

27. A compound as set forth in claim 1 wherein R is

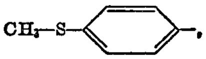

$R_1$ is H, $R_2$ is

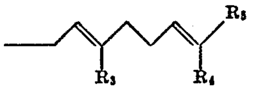

, $R_3$ is $CH_3$, $R_4$ is $CH_3$ and $R_5$ is $CH_3$.

28. A compound as set forth in claim 1 wherein R is

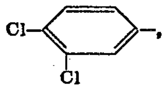

$R_1$ is H, $R_2$ is

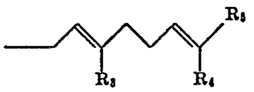

, $R_3$ is $CH_3$, $R_4$ is $CH_3$ and $R_5$ is $CH_3$.

29. A compound as set forth in claim 1 wherein R is

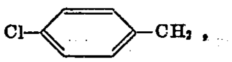

$R_1$ is H, $R_2$ is

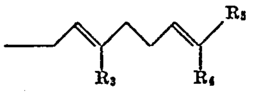

, $R_3$ is $CH_3$, $R_4$ is $CH_3$ and $R_5$ is $CH_3$.

30. A compound as set forth in claim 1 wherein R is $C_2H_5$, $R_1$ is $C_2H_5$, $R_2$ is

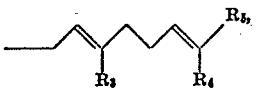

$R_3$ is $CH_3$, $R_4$ is $CH_3$ and $R_5$ is $CH_3$.

31. A compound as set forth in claim 1 wherein R is $C_2H_5$, $R_1$ is $CH_3$, $R_2$ is

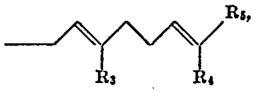

$R_3$ is $CH_3$, $R_4$ is $CH_3$ and $R_5$ is $CH_3$.

32. A compound as set forth in claim 1 wherein R is $C_2H_5$, $R_1$ is $C_2H_5$, $R_2$ is

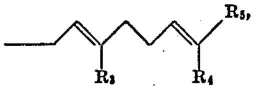

$R_3$ is $C_2H_5$, $R_4$ is $C_2H_5$ and $R_5$ is $CH_3$.

33. A compound as set forth in claim 1 wherein R is $C_2H_5$, $R_1$ is $C_2H_5$, $R_2$ is

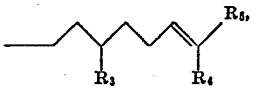

$R_3$ is $CH_3$, $R_4$ is $CH_3$ and $R_5$ is $CH_3$.

34. A compound as set forth in claim 1 wherein R is i-$C_3H_7$, $R_1$ is $CH_2CN$, $R_2$ is

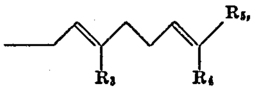

$R_3$ is $CH_3$, $R_4$ is $CH_3$ and $R_5$ is $CH_3$.

35. A compound as set forth in claim 1 wherein R is $CH_3$, $R_1$ is $CH_2CH{=}CH_2$, $R_2$ is

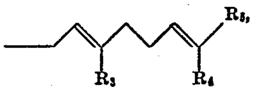

$R_3$ is $CH_3$, $R_4$ is $CH_3$ and $R_5$ is $CH_3$.

36. A compound as set forth in claim 1 wherein R is $CH_3$, $R_1$ is $CH_2C{\equiv}CH$, $R_2$ is

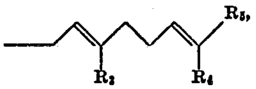

$R_3$ is $CH_3$, $R_4$ is $CH_3$ and $R_5$ is $CH_3$.

37. A compound as set forth in claim 1 wherein R is $CH_3$, $R_1$ is $CH_2OCH_3$, $R_2$ is

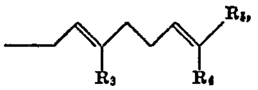

$R_3$ is $CH_3$, $R_4$ is $CH_3$ and $R_5$ is $CH_3$.

38. A compound as set forth in claim 1 wherein R is $CH_3{-}C{\equiv}C{-}CH_2$, $R_1$ is $C_2H_5$, $R_2$ is

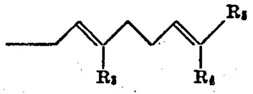

, $R_3$ is $CH_3$, $R_4$ is $CH_3$ and $R_5$ is $CH_3$.

39. A compound as set forth in claim 1 wherein R is

$R_1$ is H, $R_2$ is

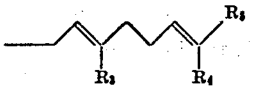

, $R_3$ is $CH_3$, $R_4$ is $CH_3$ and $R_5$ is $CH_3$.

No references cited.

LEWIS GOTTS, Primary Examiner

D. R. PHILLIPS, Assistant Examiner

U.S. Cl. X.R.

260—348 A, 348 R; 424—278, 300